United States Patent [19]
Kim

[11] Patent Number: 6,141,297
[45] Date of Patent: Oct. 31, 2000

[54] MAGNETO-OPTICAL RECORDING MEDIUM

[75] Inventor: Jin-Hong Kim, Kyungki-do, Rep. of Korea

[73] Assignee: LG Electronics Inc., Seoul, Rep. of Korea

[21] Appl. No.: 09/263,882

[22] Filed: Mar. 8, 1999

[30] Foreign Application Priority Data

| | | | |
|---|---|---|---|
| Mar. 11, 1998 | [KR] | Rep. of Korea | 98-8138 |
| May 15, 1998 | [KR] | Rep. of Korea | 98-17604 |
| Jun. 23, 1998 | [KR] | Rep. of Korea | 98-23632 |
| Oct. 8, 1998 | [KR] | Rep. of Korea | 98-42089 |

[51] Int. Cl.$^7$ ................................................. G11B 11/00
[52] U.S. Cl. .................................. 369/13; 428/694 MM
[58] Field of Search ........................... 369/13, 14, 110, 369/116; 360/59, 114; 365/122; 428/694 ML, 694 MM

[56] References Cited

U.S. PATENT DOCUMENTS

| | | | |
|---|---|---|---|
| 5,939,187 | 8/1999 | Hirokane et al. | 369/13 |
| 5,955,191 | 9/1999 | Hirokane et al. | 369/13 |
| 5,982,715 | 11/1999 | Mori et al. | 369/13 |

*Primary Examiner*—Tan Dinh
*Attorney, Agent, or Firm*—Fleshner & Kim, LLP

[57] ABSTRACT

Magneto-optical recording medium having a reproduction layer of multilayer wherein a multilayer of magnetic/non-magnetic layers is used as the reproduction layer or a recording layer in MSR or MAMMOS magneto-optical disk and thicknesses of layers in the multilayer are adjusted or a noble metal intermediate layer is introduced between the reproduction layer and the recording layer for improving a signal quality with an improvement of a resolution, thereby allowing application, not only to a red region with long wavelengths, but also to a blue region with short wavelengths, permitting a wide use and suitable for a high density disk.

26 Claims, 5 Drawing Sheets

MAGNETO-OPTICAL RECORDING MEDIUM

BACKGROUND OF THE INVENTION

1. Field of the Invention

The present invention relates to a magneto-optical recording medium, and more particularly, to a magneto-optical recording medium having a reproducing layer of superlattice multilayer.

2. Background of the Related Art

As demands on high density information recording/reproduction have been increased recently, a high density recording using a laser beam has been paid much attention. Particularly, the magneto-optical disk is an attractive recording medium because it allows repetitive recording and erasure of information, and can easily implement the high density recording. There have been active researches on the magneto-optical disk.

Recording information by forming a magnetic domain in a perpendicular magnetic thin film using a laser beam and a magnetic field, and reproducing the information using a magneto-optical effect, the magneto-optical disk widely uses RE-TM(Rare Earth-Transition Metal) alloy groups as a recording layer material. The transition metal elements are Fe, Co, and etc., which are ferromagnetic, and the rare earth elements are Tb, Dy, Gd, Sm, and Ho, and etc. One of the most important objects of the magneto-optic disk is to record more information within a unit area and to reproduce the recorded information without any error. The strategy of laser-pumped magnetic field modulation used for recording more information within the unit area has facilitated formation of a small, but stable magnetic domains by applying laser pulses and an external magnetic fields simultaneously. Though the high density recording is possible by forming the smaller magnetic domain than the size of a recording laser beam in the recording, a new reproduction technology is required when the magnetic domain has a size substantially smaller than a size of the reproducing laser beam. Because the reproduction error increases with increasing noise and decreasing carrier-to-noise ratio(CNR) due to the infiltrated signal from adjacent magnetic domains when the recorded domains were much smaller than those of the reproducing laser beam.

Therefore, special reproduction methods are required for solving the problems.

The first method is MSR(Magnetically induced Super Resolution) in which an aperture of a reproduction layer is opened in the high temperature area of center portion of the reproducing laser beam having a Gaussian temperature distribution in order to duplicate a signal from the recording layer. In a CAD(Center Aperture Detection) MSR, a direction of magnetization of the reproduction layer is horizontal at a room temperature.

The second method is MAMMOS(Magnetic AMplifying Magneto-Optical System) which is applied to a case when a recording density is made very high, the small recorded domain in a recording layer is enlarged in a reproducing layer for making a reproduced signal larger. Here, a GdFeCo alloy which has the magnetic easy axis with the horizontal direction is used as the reproduction layer in the first method, and a GdFeCo alloy which has the magnetic easy axis with the vertical direction is used as the reproduction layer in the second method.

However, the magneto-optical disk with a reproduction layer of GdFeCo alloy has problems in which the magneto-optical disk can not be actually used in a blue region because, even though the magneto-optical disk has a Kerr rotation angle of 0.25~0.3° in a long wavelengths of infrared~red region, the magneto-optical disk has a small Kerr rotation angle below 0.2° in the short wavelengths of blue region. That is, despite a large reproduction signal should be provided at a short wavelengths of light for improving the recording density, the foregoing magneto-optical disk can not provide the larger reproduction signal due to the small Kerr rotation angle at a short wavelength. Moreover, the transcription from a small magnetic domain recorded in the recording layer to the reproduction layer is unclear due to the small size of recorded domains with the Gaussian temperature profile of the reproduction laser beam, which causes a problem of poor resolution.

SUMMARY OF THE INVENTION

Accordingly, the present invention is directed to a magneto-optical recording medium that substantially obviates one or more of the problems due to limitations and disadvantages of the related art.

An object of the present invention is to provide a magneto-optical recording medium in which a recording layer and a reproduction layer are formed of new material for improving a quality and a resolution of a reproduced signal and facilitating high density recording even in a blue region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the magneto-optical recording medium includes a recording layer for recording a data thereon and a reproduction layer for reproducing the data from the recording layer, wherein either the reproduction layer or the recording layer includes a multilayer having non-magnetic layers and magnetic layers stacked, alternatively. Each of the magnetic layers is formed of a material selected from Co, Fe and Ni or an alloy of them, and each of the non-magnetic layers is formed of a material selected from Pt, Pd, Ag and Au or an alloy of them. While a thickness of each of the magnetic layers in the reproduction layer is fixed, thicknesses of the non-magnetic layers only are formed gradually thinner in a recording layer direction, or, while a thickness of each of the non-magnetic layers in the reproduction layer is fixed, thicknesses of the magnetic layers only are formed gradually thicker in the recording layer direction. The multilayer includes magnetic layers each having one or more than one atomic layer and non-magnetic layers each having three or less than three atomic layers, or magnetic layers each having two or more than two atomic layers and non-magnetic layers each having two or more than two atomic layers.

In another aspect of the present invention, there is provided a magneto-optical recording medium including a substrate, a dielectric layer on the substrate, a reproduction layer having a multilayer of non-magnetic layers and magnetic layers stacked alternatively on the dielectric layer for enlarging a data transcribed from a recording layer to enlarge the reproduction signal, an intermediate layer formed of one of a noble metals such as Pt, Pd, Au, and Ag with a great magnetic susceptibility on the reproduction layer, the recording layer formed on the intermediate layer for recording information thereon and reproducing the recorded information at a particular temperature, and a protection layer formed on the recording layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. An inventive concept of the present invention lies on employment of a multilayer of magnetic layer/non-magnetic layer as an MSR (Magnetic Super Resolution) or an MAMMOS(Magnetic AMplifying Magneto-Optical System) magneto-optical disk for improving a resolution and providing a large reproduction signal, not only at long wavelengths lights, but also at short wavelengths light.

FIRST EMBODIMENT

Figure 1:
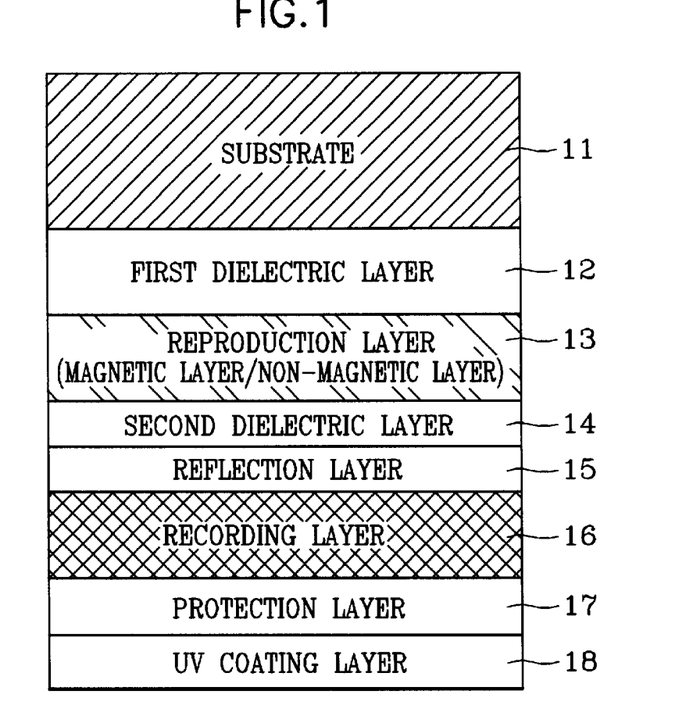
FIG. 1 illustrates a cross section showing a structure of magneto-optical disk in accordance with the first preferred embodiment of the present invention.

FIG. 1 illustrates a cross section showing a structure of magneto-optical disk in accordance with the first preferred embodiment of the present invention.

Referring to FIG. 1, the magneto-optical disk in accordance with the first preferred embodiment of the present invention includes a first dielectric layer 12 on a substrate 11, a reproduction layer 13 for reproducing information (data) recorded on a recording layer, a second dielectric layer 14, a reflection layer 15, the recording layer 16 for recording the information thereon and transcribing the information to the reproduction layer 13 at a particular temperature, a protection layer 17, and a UV coating layer 18, formed in succession. The first and second dielectric layers 12 and 14 and the protection layer 17 are formed of $Si_3N_4$ or AlN, the reproduction layer 13 is formed of a superlattice multilayer of magnetic layer/non-magnetic layer, the reflection layer 15 is formed of AlTi, and the recording layer 16 is formed of either a superlattice multilayer of magnetic layer/non-magnetic layer or TbFeCo. The magnetic layers in superlattice multilayer have a thickness ranging 2~8 Å, and the non-magnetic layer in superlattice multilayer have a thickness ranging 4~20 Å. The magnetic layers in the superlattice multilayer are formed of a material selected from Co, Fe, and Ni or an alloy of them, and the non-magnetic layers in the superlattice multilayer are formed of a material selected from Pt, Pd, Ag, and Au or an alloy of them.

The reproduction layer and the recording layer are formed of the superlattice multilayer of magnetic layer/non-magnetic layer because of the following reasons.

First, for example, a Co/Pt superlattice multilayer or a Co/Pd superlattice multilayer has a Kerr rotation angle of approx. 0.3° in a blue region with a short wavelength (about 400 nm), which is greater by approx. 0.1° compared to the related art GdFeCo. Accordingly, the disk of the present invention can provide a large reproduction signal in the blue region. Moreover, since the Co/Pt superlattice multilayer or the Co/Pd superlattice multilayer has a Kerr rotation angle of approx. 0.25° in a red region with a long wavelength (about 650 nm), which is similar to the related art GdFeCo, the magneto-optical disk of the present invention has an advantage in that a range of application can be extended from the blue region with a short wavelength to the red region with a long wavelength.

Second, the strong anti-oxidation property of the superlattice multilayer of magnetic layer/non-magnetic layer of the recording layer and the reproduction layer allows formation of the first and second dielectric films 12 and 14 of oxides and to dispense with the protection layer 17 and the reflection layer 15, thereby simplifying the structure.

Figure 2:
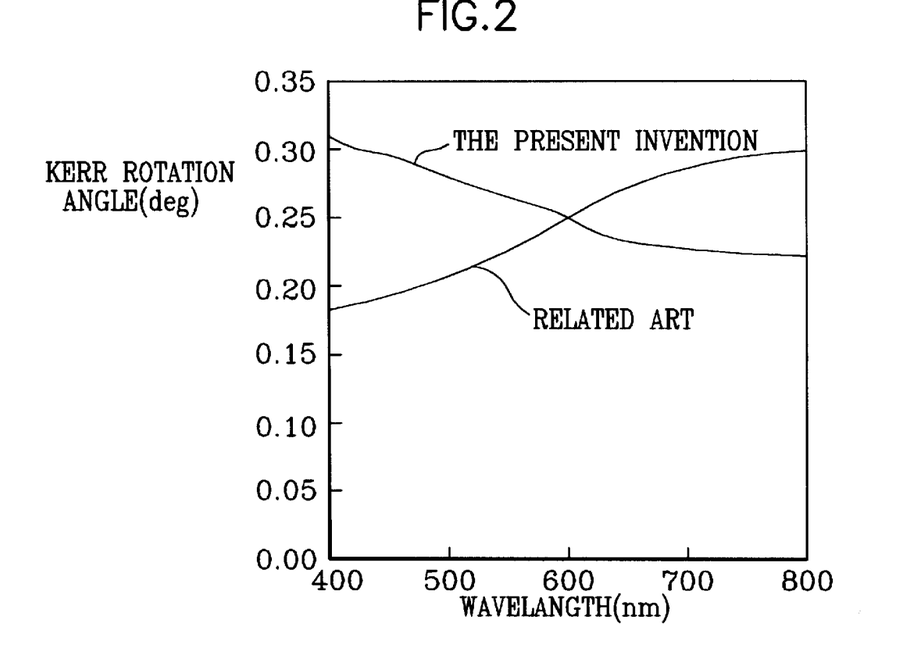
FIG. 2 illustrates a graph comparing Kerr rotation angles as a function of wavelengths of the related art and the present invention.

FIG. 2 illustrates a graph comparing Kerr rotation angles as a function of wavelength for the related art and the present invention, wherefrom it can be known that the related art magneto-optical disk can not be used in the blue region in which a recording density can be improved because the related art magneto-optical disk shows a Kerr rotation angle of approx. 0.25~0.3° in the red region with a long wavelength and a smaller Kerr rotation angle of less than 0.2° in the blue region with a short wavelength. Different from this, the magneto-optical disk of the present invention can provide a large reproduction signal in the blue region as the magneto-optical disk of the present invention has a Kerr rotation angle of approx. 0.25~0.3° in the red region with a long wavelength similar to the related art and a Kerr rotation angle of approx. 0.3° in the blue region with a short wavelength, which is greater than the related art.

The magneto-optical recording medium of the present invention with the aforementioned reproduction layer can be reproduced by the external magnetic field in a form of DC, AC, or pulse in the reproducing process in order to enlarge small bits in the reproduction layer, which were transcribed from the recording layer. In this process, the high temperature portion of the aperture having perpendicular magnetic anisotropy in which the direction of the magnetization in reproduction layer was transcribed from the recording layer. On the other hand, there is a case when the anisotropy in the reproduction layer has an intermediate value between perpendicular and horizontal. The magnetization direction of the transcribed bits in reproduction layer become same direction of the recording layer which contains digital information, due to the stray field from the recorded domain. In this case, an external magnetic field is applied to enlarge the transcribed bits in the reproduction layer.

SECOND EMBODIMENT

Figure 3:
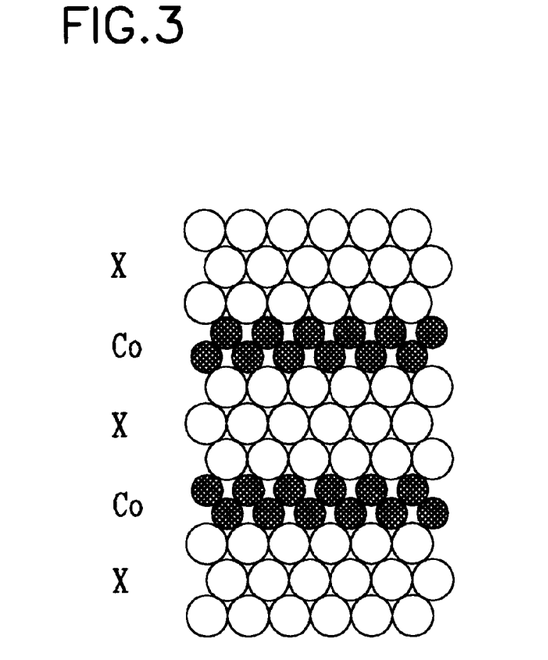
FIG. 3 illustrates a reproduction layer of cobalt based multilayer having a perpendicular anisotropy.

In this second embodiment, a thickness of the magnetic layer or the non-magnetic layer in the multilayer is adjusted. A principle of the second embodiment will be explained taking a cobalt based superlattice multilayer as an example. FIG. 3 illustrates a reproduction layer of cobalt based multilayer having a perpendicular anisotropy.

Figure 4:
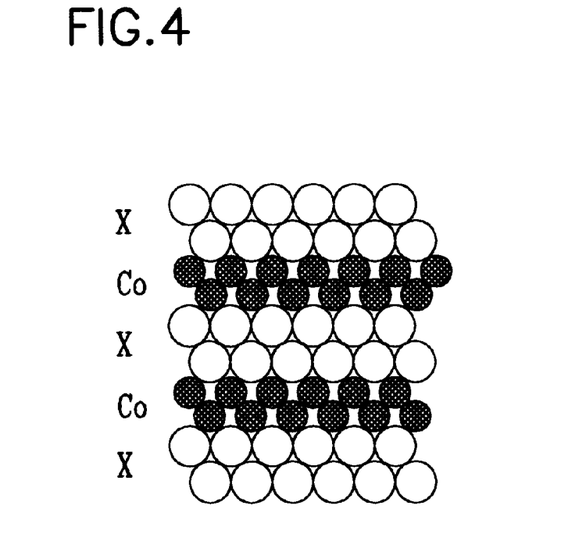
FIG. 4 illustrates a reproduction layer of cobalt based multilayer having a horizontal anisotropy due to thin X(non-magnetic) layers.
Figure 5:
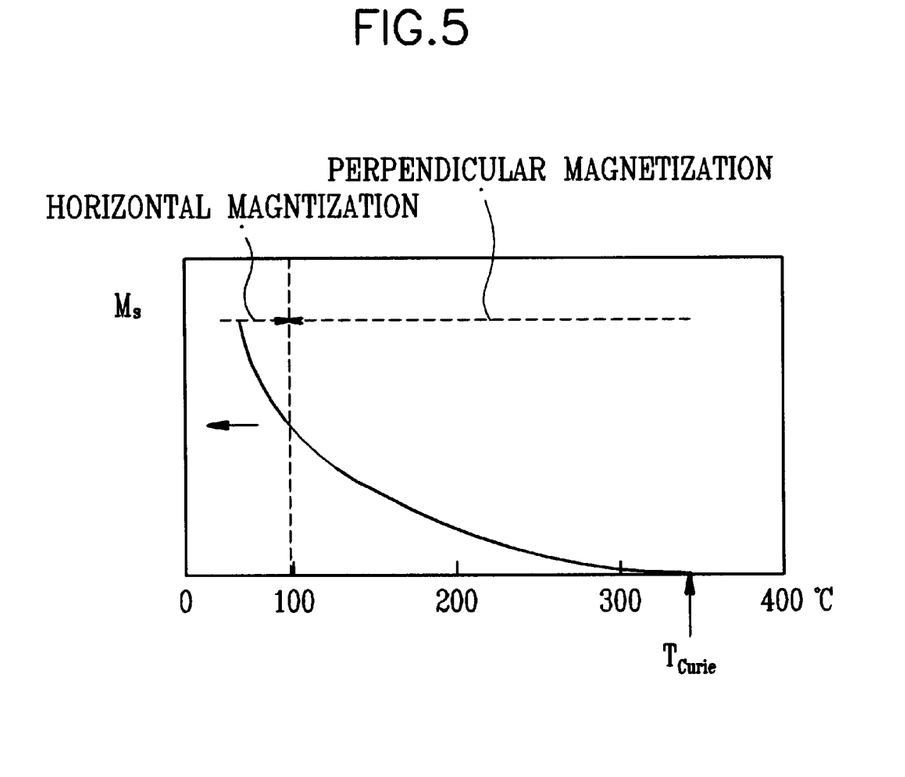
FIG. 5 illustrates a graph showing the dependence of Ms(saturation magnetization) on temperatures of a reproduction layer of cobalt based multilayer.
Figure 6:
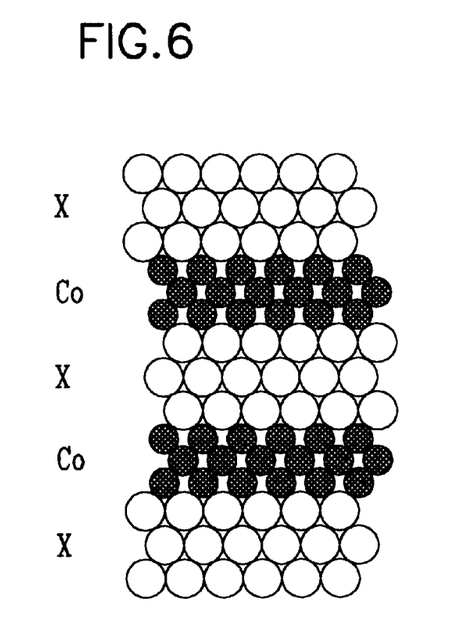
FIG. 6 illustrates a reproduction layer of cobalt based multilayer having a horizontal anisotropy due to thick Co layers.
Figure 7:
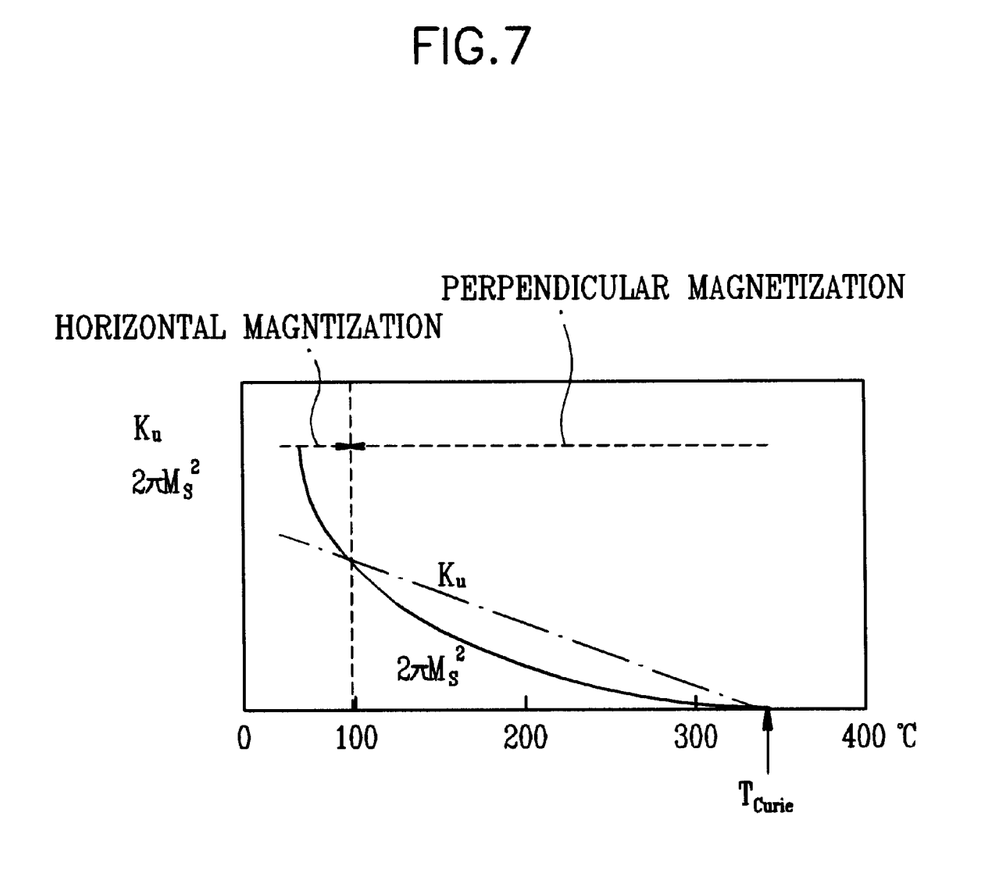
FIG. 7 illustrates a graph showing the dependence of Ku(anisotropy energy) and $2\pi Ms^2$ on temperature of a reproduction layer of cobalt based multilayer.

Referring to FIG. 3, the cobalt based multilayer includes cobalt sublayers having two atomic layers and X sublayers (non-magnetic layers) having three atomic layers. When the cobalt based multilayer with such a thickness configuration has a planar interface between adjacent layers, the cobalt based multilayer has a perpendicular anisotropy at a room temperature. The perpendicular magnetic anisotropy of each layer in the multilayer, called as an interface or surface anisotropy, is found at an interface between a magnetic sublayer and a non-magnetic sublayer. However, as shown in FIG. 4, if the thickness of each of the X layers (for example, of Pt or Pd) is reduced to shorten a distance between adjacent magnetic layers, an interaction between the magnetic layers is increased, to have an easy direction of magnetization in a horizontal direction. When the multilayer of the reproduction layer is heated to elevated a temperature thereof, a saturation magnetization (Ms) of the magnetic layer is reduced together with a reduction of the interaction between the magnetic layers, that causes a change in which the easy direction of magnetization is changed from a horizontal direction to a perpendicular direction. That is, FIG. 5 shows the dependence of Ms on temperature in which the reduction of the exchange strength can be predicted with decreasing Ms. As another example in FIG. 6, there is a case when the magnetic layer is made thicker. In this case, cobalt atoms which fail to have an interface with the X layer fail to have the perpendicular anisotropy, but, instead, to have the horizontal magnetic anisotropy. However, even in this case too, as shown in FIG. 7, it can be known that, when the reproduction layer is heated to elevate temperature thereof, a shape anisotropy energy ($2\pi Ms^2$) is reduced along with the reduction of Ms, to make perpendicular anisotropy. That is, when the reproduction layer is heated up to a certain temperature higher than a particular temperature, a section is formed in which a perpendicular anisotropy energy (Ku) becomes higher than the shape anisotropy energy ($2\pi Ms^2$), which leads to have a perpendicular anisotropy.

Utilizing this principle, the second embodiment of the present invention facilitates to form a reproduction layer which has an easy direction of magnetization in a horizontal direction at a room temperature and an easy direction of magnetization in a perpendicular direction when the reproduction layer is heated by the reproducing laser beam during reproduction. This phenomenon can be achieved by adjusting the thickness of sublayers in the multilayer which can be adopted as the reproduction layer providing a large signal at a blue wavelength. That is, in this second embodiment, as shown in FIGS. 4 and 6, the reproduction layer is formed of a superlattice multilayer having stacks of magnetic layer and non-magnetic layer, wherein either each of the magnetic layers in the multilayer is adjusted to have a thickness of more than two atomic layers or each of the non-magnetic layers in the multilayer is adjusted to have a thickness of less than three atomic layers. The atoms in the magnetic layers are transition metals, such as Co, Fe and Ni or an alloy of them, and the atoms in the non-magnetic layers are noble metals, such as Pt, Pd, Ag and Au or an alloy of them, of which typical multilayer is Co/Pt or Co/Pd.

THIRD EMBODIMENT

Figure 8:
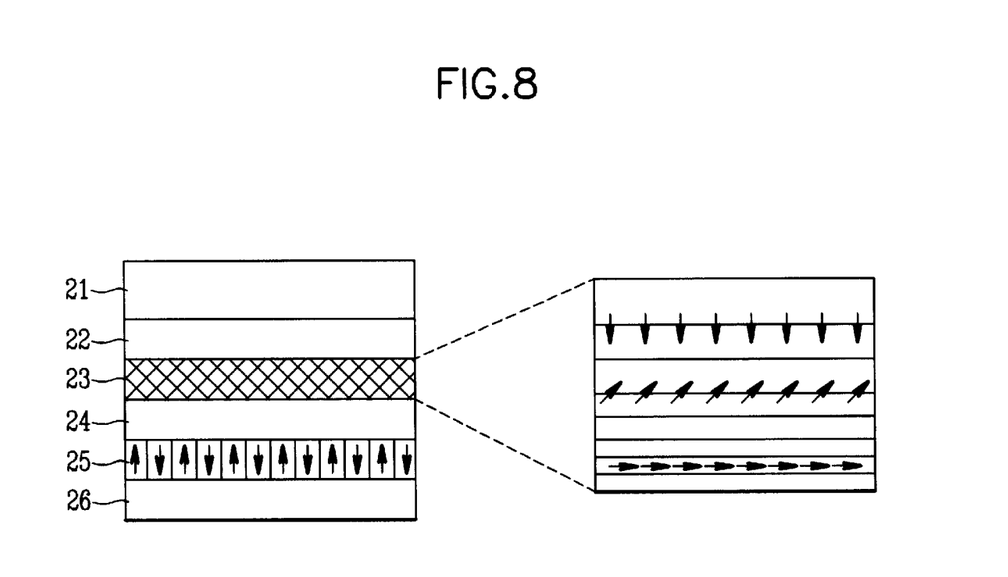
FIG. 8 illustrates a cross section showing a structure of magneto-optical disk in accordance with the third preferred embodiment of the present invention together with a direction of magnetization of a reproduction layer; and, FIG. 9 illustrates a cross section showing a direction of magnetization of a reproduction layer in reproduction of a magneto-optical disk in accordance with the third preferred embodiment of the present invention.

In this third embodiment, a thickness of each of magnetic and non-magnetic sublayers in multilayer is varied with a gradient for modulating a magnetic property. FIG. 8 illustrates a cross section showing a structure of magneto-optical disk in accordance with the third preferred embodiment of the present invention together with a direction of magnetization of a reproduction layer.

Referring to FIG. 8, the magneto-optical disk in accordance with the third preferred embodiment of the present invention includes the first dielectric layer 22 on a substrate 21, a reproduction layer 23, the second dielectric layer 24, a recording layer 25, and a protection layer 26, formed in succession. The recording layer 25 serves for recording information thereon and transcribing the information to the reproduction layer 23 and is formed of TbFeCo or is a multilayer of a magnetic layer/non-magnetic layer stack. The reproduction layer is a superlattice multilayer having magnetic layer/non-magnetic layer stack. In this instance, layers in the superlattice multilayer of the reproduction layer near to the recording layer 25 are formed to have thicknesses which can have horizontal anisotropies, and other layers in the superlattice multilayer near to the substrate 21 are formed to have thicknesses which can have perpendicular anisotropies. That is, as shown in FIG. 8, either thicknesses of the non-magnetic layers in the multilayer only in the direction of the recording layer 25 are formed gradually thinner or thicknesses of the magnetic layers in the multilayer only in the direction of the recording layer 25 are formed gradually thicker. For example, while a thickness of each of the magnetic layers in the superlattice multilayer is fixed to approx. 4 Å, a thickness of the non-magnetic layer adjacent to the recording layer 25 is formed to be approx. 4 Å and thicknesses of the non-magnetic layers are formed gradually the thicker as the non-magnetic layers are the nearer to the substrate 21 such that a thickness of the non-magnetic layer adjacent to the substrate 21 to be approx. 9 Å. Or as an alternative, while a thickness of each of the non-magnetic layers in the superlattice multilayer is fixed to approx. 9 Å, a thickness of the magnetic layer adjacent to the substrate 21 is formed to be approx. 4 Å and thicknesses of the magnetic layers are formed gradually the thicker as the magnetic layers are the nearer to the recording layer 25 such that a thickness of the magnetic layer adjacent to the recording layer 25 to be approx. 10 Å. Upon formation of the reproduction layer 23 thus, layers in the superlattice multilayer which is the reproduction layer adjacent to the recording layer 25 have horizontal anisotropies, layers in the superlattice multilayer adjacent to the substrate 21 have perpendicular anisotropies, and layers in the middle of the superlattice multilayer have intermediate forms of anisotropies. The magnetic layers in the superlattice multilayer are formed of a material selected from Co, Fe and Ni or an alloy of them, and the non-magnetic layers in the superlattice multilayer are formed of a material selected from Pt, Pd, Ag and Au or an alloy of them. The first and second dielectric layers 22 and 24 and the protection layer 26 are in general formed of $Si_3N_4$ or AlN.

Figure 9:
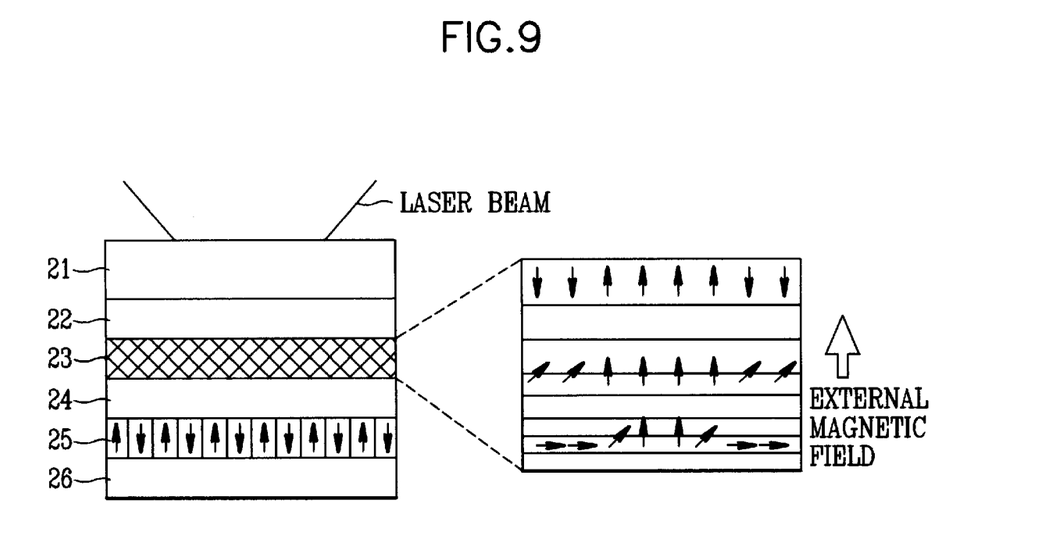

FIG. 9 illustrates a cross section showing a direction of magnetization of a reproduction layer in the reproduction process of a magneto-optical disk in accordance with the third preferred embodiment of the present invention. The third embodiment reproducing method will be explained with reference to FIG. 9.

When a laser beam is irradiated to a reproduction layer 23, sublayers in the reproduction layer 23 adjacent to the recording layer 25 are involved in temperature rise, to change a direction of magnetization of the sublayers to be the same with the direction of magnetization of bits recorded on the recording layer 25 because of the stray field from the recorded bit. That is, the direction of magnetization of the sublayers is changed from the horizontal direction to the perpendicular direction the same with the bits recorded on the recording layer 25. In the transcription of the recorded bits toward sublayers on the substrate side through intermediate sublayers of the reproduction layer 23, a transcribed area of the recorded bits in each of the intermediate sublayers becomes larger because the tendency to be perpendicular in each of the intermediate sublayers is greater than in the sublayers adjacent to the recording layer 25, and that is the largest at the sublayer nearest to the substrate 21, which improves the resolution of small recorded bits. That is, after a magnetic domain recorded smaller than the diameter of a laser beam is reproduced on a sublayer in the reproduction layer 23 nearest to the recording layer 25, the magnetic domain is enlarged on each of the intermediate sublayers in the reproduction layer 23, to be the greatest on the sublayer in the reproduction layer 23 nearest to the substrate 21, to provide the amplified signal. If an external magnetic field is applied to the magneto-optical disk for enlarging the magnetic domain, the reproduced signal from the recorded bits is further enlarged, which improves the resolution further. After the signal was reproduced using the external magnetic field, after an opposite direction of external magnetic field is applied to erase the transcribed domain in the reproduction layer, the next region of the recording layer is reproduced by the aforementioned process. Thus, the third embodiment of the present invention facilitates an improvement of resolution by varying thicknesses of sublayers in the reproduction layer having a multilayer of magnetic layer/non-magnetic layer and removing an unclear transcription portion formed at an outer portion of a reproduced signal reproduced from the reproduction layer.

FOURTH EMBODIMENT

In the fourth embodiment, an intermediate layer of a noble metal with a great susceptibility is inserted between a recording layer and a reproduction layer for effective transfer of a signal recorded from the recording layer to the reproduction layer of superlattice multilayer. Though a second dielectric film is provided between the recording layer and the reproduction layer in each of the first to third embodiments, in this fourth embodiment, an intermediate layer of a noble metal is provided instead of the second dielectric layer. The noble metal may be Pt, Pd, Ag and Au. The noble metal, being non-magnetic, breaks an exchange coupling between the recording layer and the reproduction layer, but effectively couples the recording layer with the reproduction layer if a magnetic field is applied thereto as the noble metal has a great magnetic susceptibility compared to the dielectric film, which merely uses a magnetostatic coupling only. The effective transfer of the signal recorded on the recording layer coming from the provision of noble metal with a great magnetic susceptibility between the recording layer and the reproduction layer renders a great SNR (Signal-to-Noise Ratio). And, the higher deposition rate of the noble metal compared to the dielectric layer can shorten a process time.

It will be apparent to those skilled in the art that various modifications and variations can be made in the magneto-optical recording medium of the present invention without departing from the spirit or scope of the invention. Thus, it is intended that the present invention cover the modifications and variations of this invention provided they come within the scope of the appended claims and their equivalents.

What is claimed is:

1. A magneto-optical recording medium comprising:
   a substrate;
   a dielectric layer on the substrate;
   a reproduction layer comprising a multilayer structure formed from alternating layers of magnetic material and non-magnetic material for enlarging data transcribed from a recording layer to enlarge the reproduction signal;
   an intermediate layer formed of a noble metal with a large magnetic susceptibility on the reproduction layer;
   a recording layer formed on the intermediate layer for recording information thereon and reproducing the recorded information at a particular temperature; and,
   a protection layer formed on the recording layer.

2. A magneto-optical recording medium as claimed in claim 1, wherein the recording layer includes a multilayer structure formed from alternating layers of magnetic material and non-magnetic material.

3. A magneto-optical recording medium as claimed in claim 1, wherein each of the magnetic layers in the reproduction layer includes Co, Fe, Ni or an alloy thereof, and each of the non-magnetic layers includes Pt, Pd, Ag, Au or an alloy thereof.

4. A magneto-optical recording medium as claimed in claim 1, wherein, while a thickness of each of the magnetic layers in the reproduction layer is fixed, thicknesses of the non-magnetic layers only are formed gradually thinner in a recording layer direction, or, while a thickness of each of the non-magnetic layers in the reproduction layer is fixed, thicknesses of the magnetic layers only are formed gradually thicker in the recording layer direction.

5. A magneto-optical recording medium as claimed in claim 1, wherein the multilayer includes magnetic layers each having at least one atomic layer and non-magnetic layers each having between one and three atomic layers.

6. A magneto-optical recording medium comprising:
   a substrate;
   a dielectric layer on the substrate;
   a reproduction layer comprising a multilayer structure formed from alternating layers of magnetic material and non-magnetic material for reproducing data at a particular temperature;
   an intermediate layer formed of a noble metal with a large magnetic susceptibility on the reproduction layer;
   a recording layer formed on the intermediate layer for recording information thereon and reproducing the recorded information at a particular temperature; and,
   a protection layer formed on the recording layer.

7. A magneto-optical recording medium as claimed in claim 6, wherein the recording layer includes a multilayer structure formed from alternating layers of magnetic material and non-magnetic material.

8. A magneto-optical recording medium as claimed in claim 6, wherein each of the magnetic layers in the reproduction layer includes Co, Fe, Ni or an alloy thereof, and each of the non-magnetic layers includes Pt, Pd, Ag, Au or an alloy thereof.

9. A magneto-optical recording medium as claimed in claim 1, wherein the multilayer structure includes magnetic layers each having at least two atomic layers and non-magnetic layers each having at least two atomic layers.

10. A magneto-optical recording medium as claimed in claim 1 wherein the multilayer structure comprises a superlattice.

11. A magneto-optical recording medium as claimed in claim 6, wherein the multilayer includes magnetic layers each having at least two atomic layers and non-magnetic layers each having at least two atomic layers.

12. A magneto-optical recording medium as claimed in claim 6 wherein the multilayer structure comprises a superlattice.

13. A magneto-optical recording medium having a recording layer for recording data thereon and a reproduction layer for reproducing the data from the recording layer, the reproduction layer comprising a multilayer structure formed from alternating layers of magnetic material and non-magnetic material.

14. A magneto-optical recording medium as claimed in claim 13 wherein, while a thickness of each of the magnetic layers in the reproduction layer is fixed, thicknesses of the non-magnetic layers only are formed gradually thinner in a recording layer direction, or, while a thickness of each of the non-magnetic layers in the reproduction layer is fixed, thicknesses of the magnetic layers only are formed gradually thicker in the recording layer direction.

15. A magneto-optical recording medium as claimed in claim 13, wherein layers in the multilayer of the reproduction layer near to the recording layer have horizontal anisotropies, and layers in the multilayer far from the recording layer have perpendicular anisotropies.

16. A magneto-optical recording medium as claimed in claim 13, wherein a non-magnetic intermediate layer comprising a noble metal with a large magnetic susceptibility is formed between the recording layer and the reproduction layer.

17. A magneto-optical recording medium as claimed in claim 13, wherein each of the magnetic layers in the reproduction layer includes Co, Fe, Ni, or an alloy thereof, and each of the non-magnetic layers includes Pt, Pd, Ag, Au or an alloy thereof.

18. A magneto-optical recording medium having a recording layer for recording data thereon and a reproduction layer for reproducing the data from the recording layer, the recording layer comprising a multilayer structure formed from alternating layers of magnetic material and non-magnetic material.

19. A magneto-optical recording medium as claimed in claim 18 wherein, while a thickness of each of the magnetic layers in the reproduction layer is fixed, thicknesses of the non-magnetic layers only are formed gradually thinner in a recording layer direction, or, while a thickness of each of the non-magnetic layers in the reproduction layer is fixed, thicknesses of the magnetic layers only are formed gradually thicker in the recording layer direction.

20. A magneto-optical recording medium as claimed in claim 18, wherein layers in the multilayer of the reproduction layer near to the recording layer have horizontal anisotropies, and layers in the multilayer far from the recording layer have perpendicular anisotropies.

21. A magneto-optical recording medium as claimed in claim 18, wherein a non-magnetic intermediate layer comprising a noble metal with a large magnetic susceptibility is formed between the recording layer and the reproduction layer.

22. A magneto-optical recording medium as claimed in claim 18, wherein each of the magnetic layers in the reproduction layer includes Co, Fe, Ni, or an alloy thereof, and each of the non-magnetic layers includes Pt, Pd, Ag, Au or an alloy thereof.

23. A magneto-optical recording medium having a recording layer for recording data thereon and a reproduction layer for reproducing the data from the recording layer, the reproduction layer comprising a multilayer structure formed from alternating layers of magnetic material and non-magnetic material, wherein the multilayer structure includes magnetic layers having at least two atomic layers and non-magnetic layers having at least two atomic layers.

24. A magneto-optical recording medium having a recording layer for recording data thereon and a reproduction layer for reproducing the data from the recording layer, the reproduction layer comprising a multilayer structure formed from alternating layers of magnetic material and non-magnetic material, wherein the multilayer structure includes magnetic layers having at least one atomic layer and non-magnetic layers having between one and three atomic layers.

25. A magneto-optical recording medium having a recording layer for recording data thereon and a reproduction layer for reproducing the data from the recording layer, the recording layer comprising a multilayer structure formed from alternating layers of magnetic material and non-magnetic material, wherein the multilayer structure includes magnetic layers having at least two atomic layers and non-magnetic layers having at least two atomic layers.

26. A magneto-optical recording medium having a recording layer for recording data thereon and a reproduction layer for reproducing the data from the recording layer, the recording layer comprising a multilayer structure formed from alternating layers of magnetic material and non-magnetic material, wherein the multilayer structure includes magnetic layers having at least one atomic layer and non-magnetic layers having between one and three atomic layers.

* * * * *